United States Patent [19]

Patapoff et al.

[11] Patent Number: 5,685,980

[45] Date of Patent: Nov. 11, 1997

[54] MINIATURIZED HANDHELD DESALINATION FIELD UNIT

[76] Inventors: Walter Patapoff, 1215 W. Camino Del Sur, San Dimas, Calif. 91773; Jim Lung Wong, 638 Bowcreek Dr., Diamond Bar, Calif. 91765

[21] Appl. No.: 612,406

[22] Filed: Mar. 7, 1996

[51] Int. Cl.[6] .................................................. B01D 24/00
[52] U.S. Cl. .................. 210/244; 210/257.2; 210/261; 210/262; 210/321.6; 210/477; 210/760
[58] Field of Search ................................ 210/652, 257.2, 210/700, 900, 428, 435, 244, 259, 261, 262, 446, 195.2, 321.84, 321.6, 439, 459, 416.1, 464, 258, 192, 477

[56] References Cited

U.S. PATENT DOCUMENTS

| | | | |
|---|---|---|---|
| 639,471 | 12/1899 | Van Alstine | 210/339 |
| 2,582,388 | 1/1952 | Mansfield | 210/335 |
| 3,756,410 | 9/1973 | Moody et al. | 210/192 |
| 4,160,727 | 7/1979 | Harris, Jr. | 210/652 |
| 4,375,409 | 3/1983 | Gentry | 210/232 |
| 4,477,347 | 10/1984 | Sylva | 210/321.84 |
| 4,548,716 | 10/1985 | Boeve | 210/652 |
| 4,595,498 | 6/1986 | Cohen et al. | 210/257.2 |
| 4,623,467 | 11/1986 | Hamlin | 210/652 |
| 4,711,723 | 12/1987 | Bray | 210/652 |
| 4,909,931 | 3/1990 | Bibi | 210/192 |
| 5,106,495 | 4/1992 | Hughes | 210/192 |
| 5,108,590 | 4/1992 | Di Santo | 210/257.2 |
| 5,114,576 | 5/1992 | Ditzler et al. | 210/195.1 |
| 5,120,437 | 6/1992 | Williams | 210/244 |
| 5,151,250 | 9/1992 | Conrad | 210/760 |
| 5,178,755 | 1/1993 | LaCrosse | 210/259 |
| 5,520,816 | 5/1996 | Kuepper | 210/652 |
| 5,607,593 | 3/1997 | Cote et al. | 210/760 |

*Primary Examiner*—Ana Fortuna

[57] ABSTRACT

A water purification unit including a water inlet having a filter adapted to remove undissolved contaminants from a raw water source. The water inlet is coupled to a water reservoir including a semi-permeable membrane adapted to remove dissolved contaminants from raw water source. The filter and the membrane function to produce permeate water having undissolved and dissolved contaminants removed therefrom. The unit further includes a pressure source positioned within the water reservoir, wherein the pressure source forces raw water through the semi-permeable membrane. In addition, the unit is provided with a purified water container in fluid communication with the water reservoir adapted to receive the permeate water, wherein the purified water container is coupled to an oxidizing agent source. The oxidizing agent from the oxidizing agent source contacts the permeate water to destroy any contaminants that still may remain in the water.

18 Claims, 2 Drawing Sheets

MINIATURIZED HANDHELD DESALINATION FIELD UNIT

BACKGROUND OF THE INVENTION

1. Field of the Invention

The invention relates to water purification systems. More particularly, the present invention relates to a three step process for the purification of water including the steps of filtration, reverse osmosis, and ozonation processing.

2. Description of the Prior Art

Clean, safe water is one of the essential ingredients to human survival. Most raw water sources, however, contain various undesirable components such as gaseous microbubbles, particulates, dissolved ionized and non-ionized solids, organics and pathogens. The need for potable water in industrialized countries is generally met through the use of large scale water processing plants that supply entire communities. The need for clean potable water is not as easily met during military applications in remote locations and in non-industrialized countries.

Specifically, the most critical survival needs of any stranded soldier are air, protection, potable water and food. Soldiers must carry a wide variety of supplies and can only carry a limited supply of water. It is, therefore, important that soldiers be able to safely replenish their water supply. Of the contaminants found in raw water sources pathogens present the greatest danger, especially during war time, because of potentially lethal biological warfare hazards.

For example, it is known that the greatest enemy of armies and navies has been disease. During the Mexican War, more than five times the number of American soldiers died of disease than died as a result of actual fighting. Similar statistics are reported for the Civil War. Specifically, the Union Army suffered 140,000 battle field deaths, but more than 224,000 servicemen perished of "other causes"—nearly all of them from disease. In World War I, more Americans succumbed to disease than to hostile action. Disease also accounted for nearly one-fourth of all American casualties during World War II.

Natural diseases are very dangerous to individuals fighting in foreign lands. Even more frightening is the notation of genetically engineered biological warfare (BW) agents, as a spin-off of the biochemical revolution now in progress. By genetically engineering certain agents, a hostile power could make them more difficult to identify and to defend against if they are dispersed in various methods, including natural water streams and various other water sources. During the Cold War the Soviets created a genetically engineered agent based on species of E. Coli that could be dumped into a water system. Conceived as a non-lethal weapon to be used in a major Warsaw Pact confrontation with NATO forces, it was engineered to be impervious to chlorine and to thrive in any growth medium desired, including water.

While soldiers fighting in non-industrialized countries are most susceptible to the dangers of raw water, the water supplies in industrialized countries are susceptible to contaminants. Portable water purification systems would therefore be useful for non-military uses.

To ensure personnel safety, any replenished water must be treated through some purification system or process. The two key features of any treatment process are (1) the separation of harmful suspended particulates and dissolved solids and (2) the removal of destructive pathogens, leaving safe drinking water and water required for hygiene and clinical purposes.

Particulate separation touches virtually every aspect of gas and liquid processing. Examples of a common particulate separation applications are an oil and air filter on a car engine or the filter on a home air conditioning unit. Common particulate separation methods include distillation, adsorption, deionization, reverse osmosis, filtration, refrigeration and flotation. Each of these methods, in combination with a disinfection process, can produce potable water. However, these methods often require large cumbersome equipment to maintain the necessary pressure differential, flow rate and separation performance.

Most particulate separation processes cannot totally disinfect or eliminate pathogens. Therefore, the second step in any purification process must be the disinfection of the water. In general, disinfection is accomplished through an oxidation process. The two most common forms of oxidation today are chlorination and ozonation.

The first observation mentioning ozone's disinfecting property for drinking water dates back to the end of the last century. Numerous research programs, both fundamental and applied, have confirmed the findings. Unanimity thus has gradually been established as to ozone's destructive action on microorganisms in water. Ozone does not discriminate based upon species, since no limits to its disinfecting power have been found in the numbers or species eliminated.

In contrast to halogens usually employed for disinfecting, ozone does not have a reversible inhibitor effect on intracellular enzymes. Because of the very high oxidation-reduction potential, ozone acts as an oxidant of the constituent elements of cell walls before penetrating inside microorganisms and oxidizing certain essential components (e.g., enzymes, proteins, DNA and RNA). When a large part of the membrane barrier is destroyed, the bacterial or protozoan cells lyse, the result is their destruction.

In contrast, if the membrane barrier is only slightly damaged as occurs with oxidants other than ozone, the membrane may be repaired by the bacterial cell. By attacking such diverse elements as plasmodia, viruses, trophozoids, cysts, spores or cellular aggregates, ozone provides a barrier to the transmission of diseases, a barrier that can be maintained with absolute safety when defined ozonation conditions are properly applied.

Ozone, like chlorine, kills microorganisms by oxidative processes. Unlike chlorine, however, its action is direct. The most actively oxidative form of chlorine is hypochlorite and hypochlorous acid, which is formed by the hydrolysis of chlorine in water. In contrast, the ozone molecule oxidizes directly, without any prior hydrolysis. Laboratory measurements show that, ozone kills E. Coli 3,125 times faster than chlorine, which means that contact time is of little consequence for ozone sterilization. Ozone at low concentrations completely controls viruses, and inactivates viruses more quickly than chlorine. Viruses were completely removed within 30 seconds contact time by a dissolved ozone residual of less than 0.5 gm/l.

It is, therefore, readily apparent that a need currently exists for a portable water purification system capable of removing all dangerous contaminants in an efficient, reliable, and convenient manner. The present invention provides such a water purification system.

SUMMARY OF THE INVENTION

An objective of the present invention is to provide a water purification unit including a water inlet having a filter adapted to remove undissolved contaminants from a raw water source. The water inlet is coupled to a water reservoir including a semi-permeable membrane adapted to remove dissolved contaminants from a raw water source. The filter and the membrane function to produce permeate water having undissolved and dissolved contaminants removed therefrom. The unit further includes a pressure source positioned within the water reservoir, wherein the pressure source forces raw water through the semi-permeable membrane. In addition, the unit is provided with a purified water container in fluid communication with the water reservoir adapted to receive the permeate water, wherein the purified water container is coupled to an oxidizing agent source. The oxidizing agent from the oxidizing agent source contacts the permeate water to destroy any contaminants that still may remain in the water.

It is another object of the present invention to provide a water purification unit wherein the water path from the semi-permeable membrane to the purified water container has a one-way check valve to keep the oxidant from travelling to the membrane and damage the unit.

It is a further object of the present invention to provide a water purification unit wherein the oxidizing agent is ozone.

It is another object of the present invention to provide a water purification unit wherein the pressure source includes a plunger head positioned within the water reservoir.

It is also an object of the present invention to provide a water purification unit wherein the semi-permeable membrane is a reverse osmosis membrane.

It is also a further object of the present invention to provide a water purification unit including carrying means for permitting an individual to carrying the water purification unit.

It is another object of the present invention to provide a method for water purification wherein water is initially filtered to remove undissolved contaminants and the filtered water is passed to a water reservoir. Pressure is then applied to force the water through a semi-permeable membrane to remove dissolved contaminants. The permeate water is then passed to a purified water container, where the permeate water is exposed to an oxidizing agent to destroy any contaminants that may be remaining in the water permeate.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
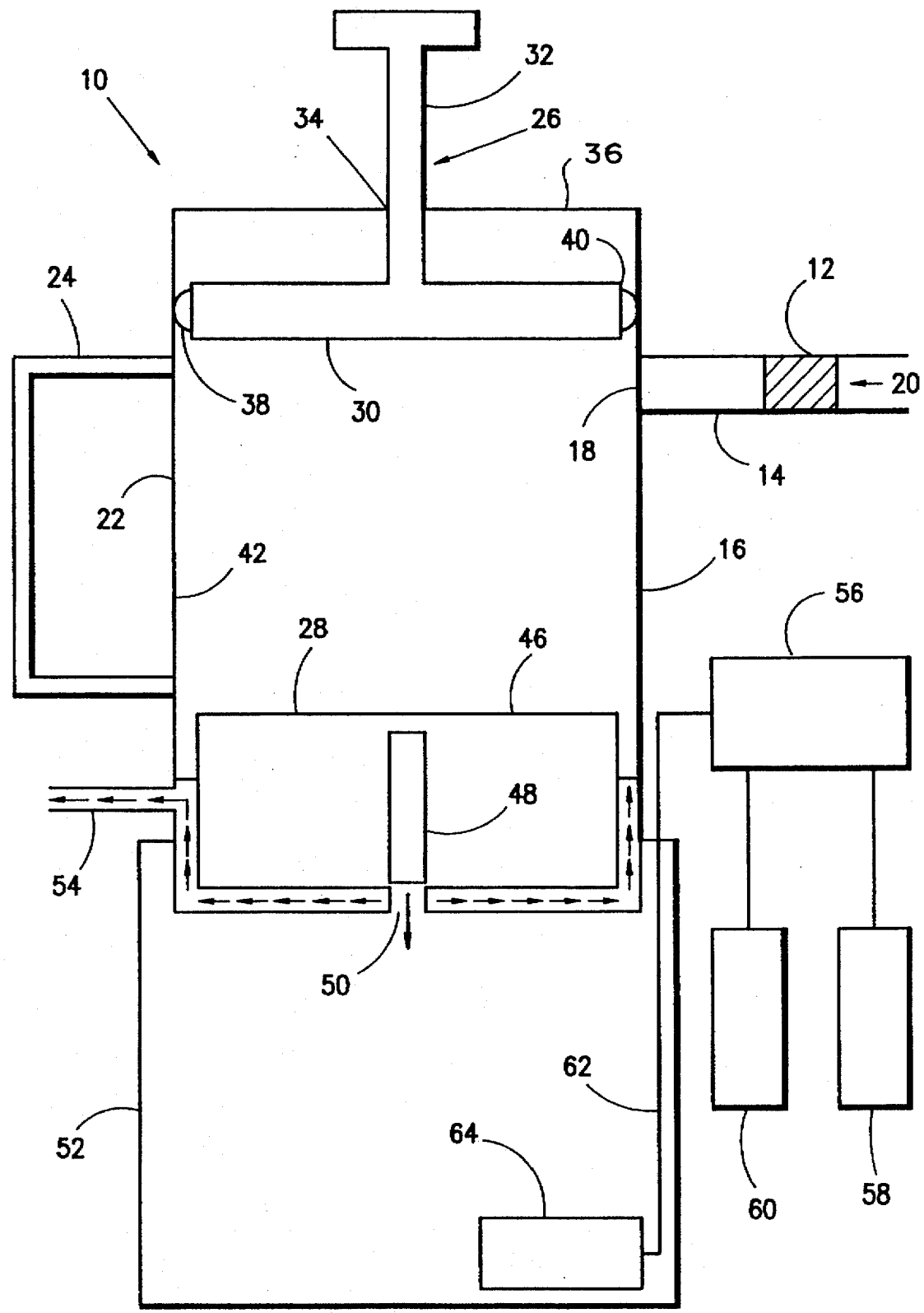
FIG. 1 is a cross-sectional schematic view of a first embodiment of the present invention.

As stated previously, clean, safe water is one of the essential ingredient to human survival, but most raw water sources contain various undesirable contaminants. With reference to FIG. 1, a water purification unit 10 is disclosed. The water purification unit 10 uses a combination of filtration and reverse osmosis processes to purify water by removing most of the contaminants found in water. Ozone, a strong oxidizing agent, then react with the remaining organics to disinfect the water. Unlike disinfectants such as chlorine or iodine, ozone leaves no halogenic compounds that can be distasteful, hazardous or even carcinogenic. All unused ozone reverts back to oxygen, which give the water a fresh taste. Furthermore, ozone is a stronger oxidizing agent than chlorine and iodine, and disinfection with ozone proceeds faster.

The water purification unit combines three processes to purify raw water, namely filtration, reverse osmosis, and ozonation processes. Briefly, raw water, which can be fresh, brackish or salt water, is passed through a filtration system to remove undissolved solids, and is pressurized to overcome the natural osmotic force. The water is then purified by exposing it to a continuous reverse osmosis process which removes dissolved solids. The water is finally disinfected by oxidizing agent, preferably ozone, to destroy any remaining organics and pathogens.

Referring to FIG. 1, water is purified by passing it through a filtration system, a reverse osmosis process, and ozone contacting process to disinfect the water.

Specifically, raw water initially passes through a filter 12 held within a raw water inlet 14. The filter 12 removes undissolved solids. The filtered water then passes through the water inlet 14 and into a water reservoir 16. The water inlet 14 is flexible tubing coupled to an opening 18 in the body of the water reservoir 16. The water inlet 14 could also be a rigid tube, and the water inlet 14 may be permanently or releasably coupled to the reservoir, without departing from the spirit of the present invention. The water inlet 14 is placed in line with the raw water source 20. The water inlet 14 may have a weight and flotation device preventing it from sucking raw water from the top or the bottom of the raw water source. The body 16 may have other openings such as a capped opening, to allow quick water filling. In addition, the reservoir body 16 may have other capped openings to allow access to the interior for repair or maintenance.

As stated previously, the water inlet 14 includes a filter 12 preventing debris and undissolved solids from entering the water reservoir. The filter 12 is removable from the water inlet 14 to permit cleaning and replacement, and to allow access to the interior of the water reservoir 16 for repair or maintenance. The filter 12 can be a screen filter, a depth filter, a media filter, a backwash filter, or a disposable filter, although other filters could be utilized without departing from the spirit of the present invention. Additionally, the materials used for the filter 12, raw water inlet 14, and reservoir 16, are selected to be chemically compatible with the oxidizing agent (e.g., ozone).

The water reservoir 16 may or may not double as the body of the desalination unit. If it does not double as the body, the water reservoir 16 includes a body 22 which is preferably made of high strength plastic or light weight metal alloys such as aluminum, although other materials could be used without departing from the spirit of the invention. The body 22 includes a handle or ergonomic grip 24 for the user to carry. The grip 24 also permits a user to operate the water purification unit in a simpler manner. The grip 24 may be a clip or a strap without departing from the spirit of the invention.

A pressure source 26 is secured to the upper end of the reservoir. The pressure source 26 is designed to generate sufficient pressure to overcome the natural osmotic pressure, and thereby force permeate (purified water) of the raw water through the reverse osmosis membrane 28 positioned at the bottom of the water reservoir 16.

The pressure source 26 can be a manual pressure source or an external automatic pressure source. The pressure source 26 forces water held within the water reservoir 16 through the reverse osmosis membrane 28. The pressure source 26 also creates a suction pressure as the plunger head 30 moves upwardly within the reservoir 16. The suction draws raw water through the filter 12 and water inlet 14 during each upward stoke of the plunger head 30. Additionally, each downward (compression) stroke of the plunger head 30 (pressure source), produces pressure in the water inlet 14 which forces a small quantity of water or compressed gas to exit the water inlet 14, and thereby backwash the filter 12.

An embodiment of the present water purification unit utilizing a manual pressure source 26 is shown in FIG. 1. The pressure source is a plunger 26 having a plunger handle 32 extending through an opening 34 in the upper wall 36 of the water reservoir 16. The plunger handle 32 is secured to a plunger head 30 positioned within the water reservoir 16. The diameter of the plunger head 30 is slightly smaller than the diameter of the water reservoir 16. A gasket 38 is secured to the outer edge 40 of the plunger head 30. The gasket 38 creates a seal between the plunger head 30 and the inner wall 42 of water reservoir 16. In use, an individual forces the plunger handle 32 downwardly to force the raw water contained within the water reservoir 16 through the reverse osmosis membrane 28. The permeate water exiting the reverse osmosis membrane 28 is free from dissolved and undissolved contaminants.

The plunger head 30 may be smaller than the diameter of the water reservoir 16, such that multiple strokes of the plunger at a lighter resistance are needed to build up the pressure necessary to force the water through the reverse osmosis membrane 28. Similarly, the manual pressure source may include a mechanical lever attached to the plunger head or the manual plunger could include a foot pump such that each step taken by the operator forces a small amount of air into the system.

Figure 2:
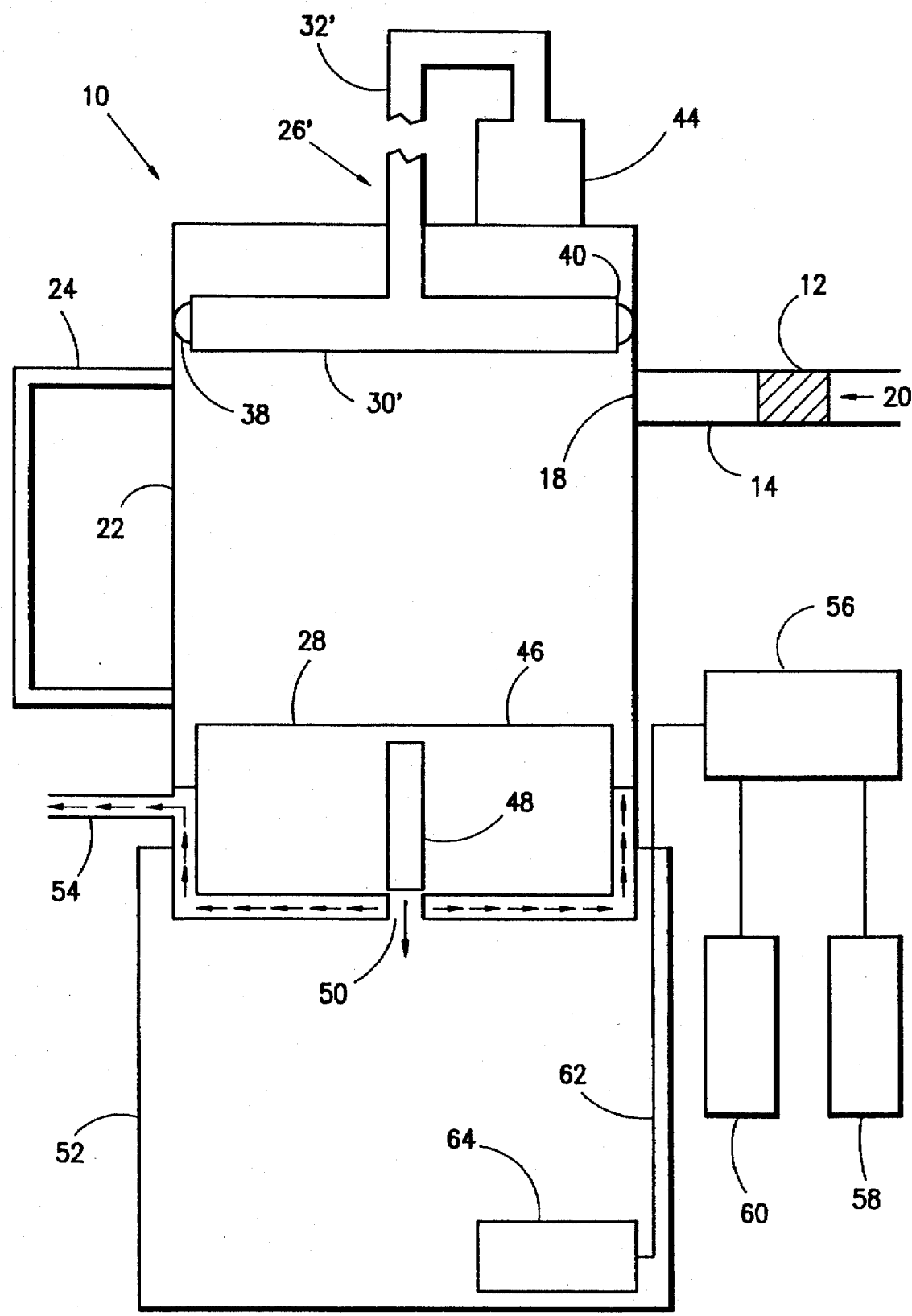
FIG. 2 is a cross-sectional schematic view of a second embodiment of the present invention.

Instead of employing a manual pressure source, the pressure source could be an external automatic pressure source 26' such as a pneumatic or electrical motor 44 as shown in FIG. 2. Specifically, the motor 44 is designed to apply downward pressure to the plunger handle 32' sufficient to force the plunger head 30' downwardly. Downward movement of the plunger head 30' forces the water held within the reservoir through the reverse osmosis membrane 28.

Other external automatic pressure sources are contemplated, and could be employed without departing from the spirit of the present invention. For example, the external pressure source could be generated by heating such as solar heating, burning wood or gunpowder. The external pressure source could also come from a canister of compressed fluid, such as the carbon dioxide cartridges.

The reverse osmosis membrane 28 is located at the bottom of the water reservoir 16. The reverse osmosis membrane 28 permits the passage of water, but prevents debris and dissolved solids, such as salt, from passing to the purified water holder. The reverse osmosis membrane is preferably made of cellulose acetate, polyamide or thin film composite membrane, however, those skilled in the art would recognize that a wide variety of materials could be used. While a reverse osmosis membrane is utilized in the preferred embodiment of the present invention, other semipermeable membranes could be utilized without departing from the spirit of the present invention.

The membrane 28 is rolled up to provide a more compact arrange for the water purification unit. However, the membrane could be utilized in flat orientation without departing from the spirit of the present invention. Raw water enters one end 46 of the rolled up membrane 28 in the axial direction. The raw water diffuses through several layers of membranes 28 toward the center axis, each layer of membrane removing a portion of the contaminants. A permeate collection tube 48 is positioned at the center of the rolled up membrane 28. The permeate water collected in the permeate collection tube 48 is channeled to the purified water outlet 50 and collected in the purified water container 52. The permeate collection tube 48 may have a one-way check valve such that ozone disinfectant cannot reach and damage the reverse osmosis membrane.

The contaminants collect on the surface of the membrane layers which are continuously cleansed by the tangential flow of raw water. The raw water with concentrated contaminants are ejected at the other end of the rolled up semi-permeable membrane, collected and discarded through the contaminant outlet 54.

The permeate, or purified, water may still contain a small number of bacteria, viruses and/or undesirable organics which are small and cannot be removed by ordinary filtration reverse osmosis methods or bypass the reverse osmosis membrane due to surface imperfections or through the imperfection of the seals. These materials are removed or disinfected by the injection of ozone, an oxidizing agent, within the purified water container. The contacting process between the ozone and the permeate water is conducted in the purified water container 52. Ozone is preferably the oxidizing agent used by the water purification unit. However, ozone could be combined with or replaced by halogens, including chlorine and iodine, without departing from the spirit of the present invention.

An ozone generator 56 generates ozone and supplies it to the purified water container 52. The ozone generator 56 may utilize UV lights, corona discharge, cold plasma or electron beam in accordance with current technological standards. The oxygen source 58 may come from atmosphere, liquid oxygen or compressed oxygen canister, or dried air. The needed electricity source 60 may be common household current, battery or solar cells. Details concerning ozone generation and oxygen supply are well known in the art, and any known ozone generating system could be used without departing from the spirit of the present invention.

The generated ozone is passed to the purified water container through an ozone coupling 62. The ozone is diffused, that is, the ozone is transferred from the gas to the liquid phase, within the permeate water through a diffusion block or sparger 64. Other methods may be used for diffusing the ozone within the permeate water, including, but not limited to, a length of piping, venturi, baffles, valves, venturi, turbine diffusion system, spinning disk contactor, hydrovac, a properly designed contacting tower with/ without absorption packings, or a tortuous path. The ozone injection rate can be controlled by the pressures of the ozone and the water permeate, the temperatures of the said agent and water, the concentration of the oxidizing agent, flow constrictions including valves, manifolds, wall smoothness, channel length and cross-section area, contact time, leakage and catalyst(s).

Diffusion of the ozone within the permeate water destroys or disinfects any pathogens and other contaminants remaining in the water, which is then ready for human consumption. The potable water is removed from the desalination field unit using various methodology based upon the application of the unit. For example, water extraction can be achieved in the following manners: suction tube, orally, extraction plumbing or any other extraction method for removing liquids from a confined and/or enclosed container. It should be understood that the capacity of this apparatus can range from a handheld personal drinking water system to a tank size system for a community.

The materials used in the water purification unit are selected to be chemically compatibility with the oxidizing agent, ozone. If chemically incompatibility cannot be avoided, a membrane or molecular sieve may be present to separate the oxidant from the said component prevent undesirable chemical reactions.

While the present invention is directed to the provision of a portable water purification unit for use in undeveloped countries and military operations, the unit could be used for recreational applications such as mountain climbing, hiking, camping, and other outdoor activities. Another use for the water purification unit is the provision of a life-sustaining water source during an emergency. For example, the water purification unit could be utilized to provide a water source for life rafts and for residents where earthquakes can damage the water supply system. The purification unit can also help to remove chlorine and certain heavy metals from current drinking water sources, and, thereby, eliminate carcinogens causing threats for the masses. Additionally, this unit can reduce chlorine dependence for pools and spas.

While various preferred embodiments have been shown and described, it will be understood that there is no intent to limit the invention by such disclosure, but rather, is intended to cover all modifications and alternate constructions falling within the spirit and scope of the invention as defined in the appended claims.

We claim:

1. A water purification unit shaped and sized to be carried by an individual, comprising:
    a water inlet including a filter adapted to remove undissolved contaminants from a raw water source, the water inlet being coupled to a water reservoir which includes a semi-permeable membrane adapted to remove dissolved contaminants from the raw water source to produce permeate water having undissolved and dissolved contaminants removed therefrom;
    a pressure source cooperating with the water reservoir, the pressure source forcing raw water through the semi-permeable membrane;
    a purified water container in fluid communication with the water reservoir to receive the permeate water, the purified water container being coupled to an oxidizing agent source, wherein an oxidizing agent from the oxidizing agent source contacts the permeate water to destroy any contaminants that still remain in the water and provide a complete supply of potable water within the purified water container; and
    wherein the purified water container is directly coupled to the water reservoir to form a complete portable water purification unit.

2. The water purification unit according to claim 1, wherein the oxidizing agent source includes means for providing ozone to the permeate water held in the purified water container.

3. The water purification unit according to claim 2, further including an electricity source coupled to an ozone generator for supplying the power necessary to produce ozone.

4. The water purification unit according to claim 1, wherein the pressure source includes a plunger head positioned within the water reservoir.

5. The water purification unit according to claim 4, wherein the pressure source further includes a plunger handle secured to the plunger head, the plunger handle extending from the water reservoir such that the plunger head can be manually actuated to force raw water through the semi-permeable membrane.

6. The water purification unit according to claim 4, wherein the pressure source includes a means for automatically forcing the plunger head downwardly to force raw water through the semi-permeable membrane.

7. The water purification unit according to claim 1, wherein the semi-permeable membrane is a reverse osmosis membrane.

8. The water purification unit according to claim 1, further including carrying means for permitting an individual to carrying the water purification unit.

9. The water purification unit according to claim 1, wherein the filter is removable and backwashable.

10. The water purification unit according to claim 1, wherein the filter is a backwash filter.

11. A water purification unit shaped and sized to be carried by an individual, comprising:
    means for filtering undissolved contaminants from a raw water source and passing the filtered water to a water reservoir, wherein the water reservoir includes means for filtering dissolved contaminants from the water to create permeate water;
    a purified water container in fluid communication with the water reservoir to receive the permeate water, the purified water container including means for oxidizing the permeate water to remove any contaminants that still may remain in the water and provide a complete supply of potable water within the purified water container; and
    wherein the purified water container is directly coupled to the water reservoir to form a complete portable water purification unit.

12. The water purification unit according to claim 11, wherein the means for filter dissolved contaminants includes a semi-permeable membrane positioned within the water reservoir and a pressure source forcing raw water through the semipermeable membrane.

13. The water purification unit according to claim 12, wherein the semi-permeable membrane is a reverse osmosis membrane.

14. The water purification unit according to claim 11, wherein the means for oxidizing includes an ozone generator in fluid communication with the purified water container.

15. The water purification unit according to claim 14, further including an electricity source coupled to the ozone generator for supplying the power necessary to produce ozone.

16. The water purification unit according to claim 14, wherein a sparger is positioned within the purified water container to diffuse ozone within the permeate water.

17. The water purification unit according to claim 11, further including carrying means for permitting an individual to carrying the water purification unit.

18. A water purification unit, comprising:
    means for filtering undissolved contaminants from a raw water source and passing the filtered water to a water reservoir, wherein the water reservoir includes means for filtering dissolved contaminants from the water to create permeate water and the means for filtering undissolved contaminants includes a filter positioned within a water inlet coupled to the water reservoir;

a purified water container in fluid communication with the water reservoir to receive the permeate water, the purified water container including means for oxidizing the permeate water to remove any contaminants that still may remain in the water and provide a complete supply of potable water within the purified water container; and wherein the purified water container is directly coupled to the water reservoir to form a complete portable water purification unit.

* * * * *